US011363128B2

(12) United States Patent
Ondo et al.

(10) Patent No.: US 11,363,128 B2
(45) Date of Patent: Jun. 14, 2022

(54) METHOD AND DEVICE FOR AUDIO INPUT ROUTING

(71) Applicant: Google Technology Holdings LLC, Mountain View, CA (US)

(72) Inventors: Kazuhiro Ondo, Buffalo, IL (US); Michael P. Labowicz, Palatine, IL (US); Hideki Yoshino, Lake Zurich, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 95 days.

(21) Appl. No.: 16/703,003

(22) Filed: Dec. 4, 2019

(65) Prior Publication Data
US 2020/0106872 A1    Apr. 2, 2020

Related U.S. Application Data

(63) Continuation of application No. 14/142,190, filed on Dec. 27, 2013, now abandoned.

(60) Provisional application No. 61/889,938, filed on Oct. 11, 2013, provisional application No. 61/857,696, filed on Jul. 23, 2013.

(51) Int. Cl.
*G06F 16/00* (2019.01)
*H04M 1/60* (2006.01)
*G06F 16/60* (2019.01)
*G10L 15/20* (2006.01)
*G10L 15/28* (2013.01)
*H04M 1/27* (2006.01)

(52) U.S. Cl.
CPC .......... *H04M 1/6041* (2013.01); *G06F 16/60* (2019.01); *G10L 15/20* (2013.01); *G10L 15/28* (2013.01); *H04M 1/271* (2013.01); *H04M 2250/74* (2013.01)

(58) Field of Classification Search
CPC ............... H04M 1/6041; H04M 1/271; H04M 2250/74; G06F 16/60; G10L 15/20; G10L 15/28
USPC ......................................................... 700/94
See application file for complete search history.

(56) References Cited

U.S. PATENT DOCUMENTS

| | | | |
|---|---|---|---|
| 5,553,220 | A | 9/1996 | Keene |
| 5,632,002 | A | 5/1997 | Hashimoto et al. |
| 5,950,157 | A | 9/1999 | Heck et al. |
| 5,970,446 | A | 10/1999 | Goldberg et al. |
| 6,032,115 | A | 2/2000 | Kanazawa et al. |

(Continued)

FOREIGN PATENT DOCUMENTS

EP    1895748    3/2008

OTHER PUBLICATIONS

AES 42 Specification c2006; "AES Standards for Acoustics—Digital Interface for Microphones". Audio Engineering Society, Inc. 2006. 43 Pages.

(Continued)

*Primary Examiner* — Paul C McCord
(74) *Attorney, Agent, or Firm* — Middleton Reutlinger

(57) ABSTRACT

A method on a mobile device for processing an audio input is described. A trigger for the audio input is received. At least one parameter is determined for an audio processor based on at least one input characteristic for the audio input. The audio input is routed to the audio processor with the at least one parameter.

19 Claims, 4 Drawing Sheets

(56) References Cited

U.S. PATENT DOCUMENTS

| | | | |
|---|---|---|---|
| 6,070,140 A | * | 5/2000 | Tran .................... G06F 1/3215 |
| | | | 704/275 |
| 6,449,496 B1 | | 9/2002 | Beith et al. |
| 6,496,743 B1 | | 12/2002 | Kokkosoulis et al. |
| 6,532,444 B1 | | 3/2003 | Weber |
| 6,553,345 B1 | | 4/2003 | Kuhn et al. |
| 6,574,599 B1 | | 6/2003 | Lim et al. |
| 6,587,867 B1 | | 7/2003 | Miller et al. |
| 6,704,707 B2 | | 3/2004 | Anderson et al. |
| 6,760,704 B1 | | 7/2004 | Bennett |
| 6,795,533 B2 | | 9/2004 | Erb et al. |
| 6,985,862 B2 | | 1/2006 | Storm et al. |
| 7,099,825 B1 | | 8/2006 | Cook |
| 7,203,644 B2 | | 4/2007 | Anderson et al. |
| 7,523,012 B2 | | 4/2009 | Shah et al. |
| 7,526,431 B2 | | 4/2009 | Roth et al. |
| 8,009,678 B2 | | 8/2011 | Brooke |
| 8,060,373 B2 | | 11/2011 | Gibbon et al. |
| 8,374,316 B2 | | 2/2013 | Burckart et al. |
| 8,386,250 B2 | | 2/2013 | Lloyd et al. |
| 8,411,603 B2 | | 4/2013 | Kong |
| 8,433,041 B2 | | 4/2013 | Clark et al. |
| 9,100,735 B1 | | 8/2015 | Taenzer |
| 9,112,989 B2 | | 8/2015 | Lee et al. |
| 2002/0046022 A1 | | 4/2002 | Rose et al. |
| 2002/0059068 A1 | | 5/2002 | Rose et al. |
| 2002/0082834 A1 | | 6/2002 | Eaves et al. |
| 2002/0087320 A1 | | 7/2002 | Lee et al. |
| 2003/0187639 A1 | | 10/2003 | Mills |
| 2003/0190037 A1 | | 10/2003 | Hruska et al. |
| 2004/0043758 A1 | | 3/2004 | Sorvari et al. |
| 2004/0268162 A1 | | 12/2004 | Morisawa |
| 2005/0049860 A1 | | 3/2005 | Junqua et al. |
| 2005/0154596 A1 | | 7/2005 | Mochary et al. |
| 2005/0175159 A1 | | 8/2005 | Cooper et al. |
| 2005/0177376 A1 | | 8/2005 | Cooper et al. |
| 2005/0180464 A1 | | 8/2005 | McConnell et al. |
| 2005/0204009 A1 | | 9/2005 | Hazarika et al. |
| 2005/0246325 A1 | | 11/2005 | Pettinati et al. |
| 2005/0273323 A1 | | 12/2005 | Inagaki |
| 2006/0009974 A1 | | 1/2006 | Junqua et al. |
| 2006/0035632 A1 | | 2/2006 | Sorvari et al. |
| 2006/0053011 A1 | | 3/2006 | Kim |
| 2006/0215856 A1 | | 9/2006 | Meyer et al. |
| 2007/0043563 A1 | | 2/2007 | Comerford et al. |
| 2007/0054686 A1 | | 3/2007 | Allen et al. |
| 2007/0060114 A1 | | 3/2007 | Ramer et al. |
| 2007/0133826 A1 | | 6/2007 | Burk et al. |
| 2007/0239454 A1 | | 10/2007 | Paek et al. |
| 2007/0255435 A1 | | 11/2007 | Cohen et al. |
| 2008/0019537 A1 | | 1/2008 | Nongpiur et al. |
| 2008/0167868 A1 | | 7/2008 | Kanevsky et al. |
| 2008/0300025 A1 | | 12/2008 | Song et al. |
| 2009/0007159 A1 | | 1/2009 | Rangarajan et al. |
| 2009/0037413 A1 | | 2/2009 | Castell et al. |
| 2009/0081953 A1 | | 3/2009 | Tian et al. |
| 2009/0228513 A1 | | 9/2009 | Tian |
| 2009/0287489 A1 | | 11/2009 | Savant |
| 2010/0049516 A1 | | 2/2010 | Talwar et al. |
| 2010/0057228 A1 | | 3/2010 | Kong et al. |
| 2010/0161340 A1 | | 6/2010 | Walsh et al. |
| 2010/0169092 A1 | | 7/2010 | Backes et al. |
| 2011/0184730 A1 | | 7/2011 | LeBeau et al. |
| 2011/0237217 A1 | | 9/2011 | Monks et al. |
| 2011/0250932 A1 | | 10/2011 | Cohen et al. |
| 2011/0288868 A1 | | 11/2011 | Lloyd et al. |
| 2012/0022874 A1 | | 1/2012 | Lloyd |
| 2012/0072221 A1 | | 3/2012 | White et al. |
| 2012/0148067 A1 | | 6/2012 | Petersen et al. |
| 2012/0166186 A1 | | 6/2012 | Acero et al. |
| 2013/0110521 A1 | * | 5/2013 | Hwang ............... H04W 52/028 |
| | | | 704/500 |
| 2013/0132072 A1 | | 5/2013 | Pradhan et al. |
| 2013/0144618 A1 | | 6/2013 | Sun et al. |
| 2013/0325484 A1 | | 12/2013 | Chakladar et al. |
| 2013/0339028 A1 | * | 12/2013 | Rosner ................. H04R 29/004 |
| | | | 704/275 |
| 2014/0122378 A1 | | 5/2014 | Swaminathan et al. |
| 2014/0156269 A1 | | 6/2014 | Lee et al. |
| 2014/0163978 A1 | * | 6/2014 | Basye .................... G10L 15/28 |
| | | | 704/233 |
| 2014/0214429 A1 | | 7/2014 | Pantel |
| 2014/0244269 A1 | | 8/2014 | Tokutake |
| 2014/0257813 A1 | * | 9/2014 | Mortensen ............. G10L 15/02 |
| | | | 704/251 |
| 2014/0257821 A1 | | 9/2014 | Adams et al. |
| 2014/0270260 A1 | | 9/2014 | Goertz et al. |
| 2014/0281628 A1 | | 9/2014 | Nigam et al. |
| 2014/0331092 A1 | | 11/2014 | Taylor et al. |
| 2014/0337036 A1 | | 11/2014 | Haiut et al. |
| 2014/0358552 A1 | * | 12/2014 | Xu ....................... G06F 1/3215 |
| | | | 704/275 |
| 2014/0372122 A1 | | 12/2014 | Harsham et al. |
| 2015/0031416 A1 | | 1/2015 | Labowicz et al. |
| 2015/0074524 A1 | | 3/2015 | Nicholson et al. |
| 2015/0221307 A1 | | 8/2015 | Shah et al. |
| 2015/0340042 A1 | | 11/2015 | Sejnoha et al. |

OTHER PUBLICATIONS

International Search Report and Written Opinion dated Jan. 20, 2015 in related International Application No. PCT/US2014/047448. 22 Pages.

AES3 Wikipedia page from archive.org dated Aug. 2012—Retrieved from: http://web.archive.org/web/20120816133639/https://en.wikipedia.org/wiki/AES3. 6 Pages.

Use Speech on my phone _ Windows Phone How-to (United States), http://www.windowsphone.com/en-us/how-to/wp8/basics/use-speech-on-my-phone; dated Aug. 13, 2018.

* cited by examiner

METHOD AND DEVICE FOR AUDIO INPUT ROUTING

TECHNICAL FIELD

The present disclosure relates to processing audio signals and, more particularly, to methods and devices for routing audio signals including voice or speech.

BACKGROUND

Although speech recognition has been around for decades, the quality of speech recognition software and hardware has only recently reached a high enough level to appeal to a large number of consumers. One area in which speech recognition has become very popular in recent years is the smartphone and tablet computer industry. Using a speech recognition-enabled device, a consumer can perform such tasks as making phone calls, writing emails, and navigating with GPS, strictly by voice.

Traditional voice recognition systems may receive an audio input from several input sources, such as a built-in microphone, a Bluetooth headset, or wired headset. However, the behavior of the traditional systems is typically the same regardless of the input source except that a voice response may be played back from a different audio output, such as a phone speaker or the corresponding headset.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
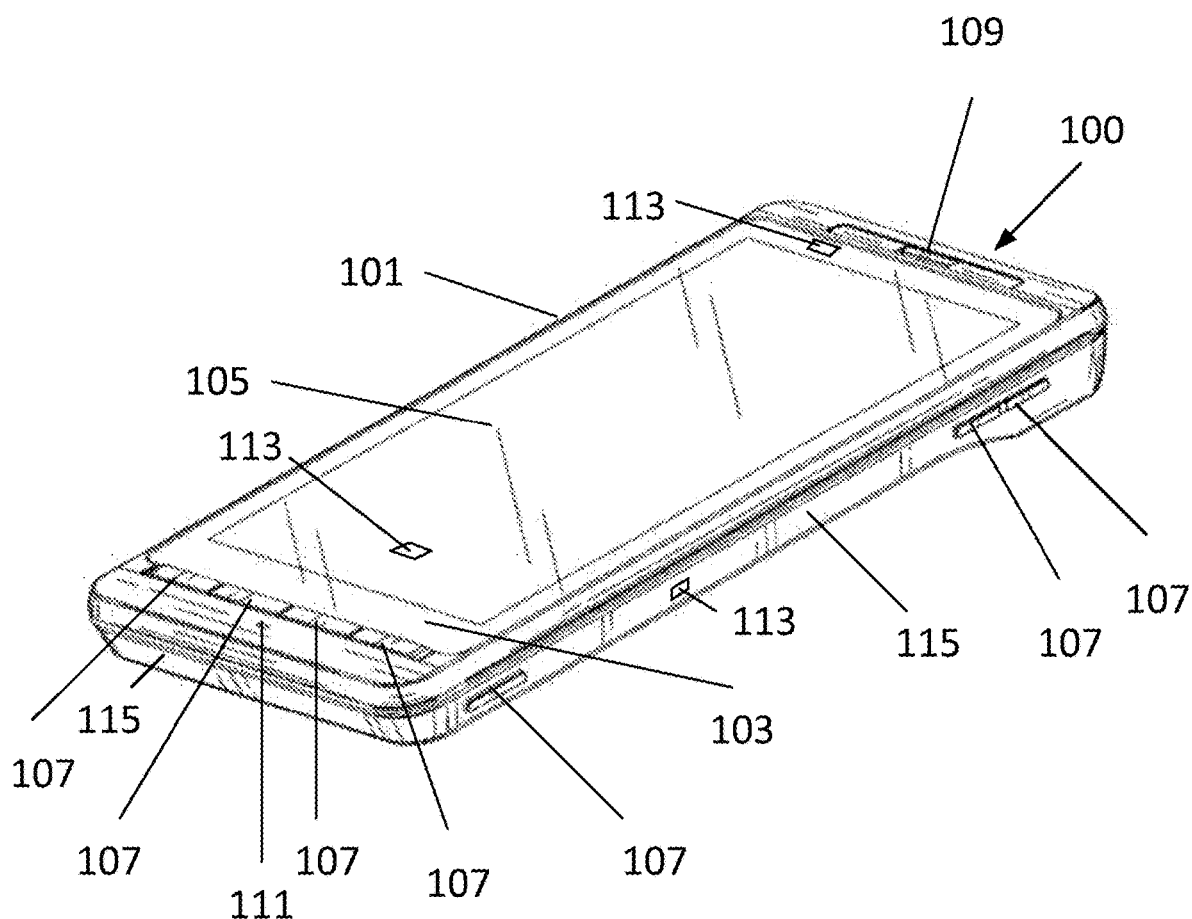
FIG. 1 is a block diagram illustrating a mobile device, according to an embodiment.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

When a user provides speech for voice recognition by a mobile device, the speech is converted by a microphone to an audio input (e.g., an analog or digital signal). The audio input may be further processed, such as converted from analog-to-digital or encoded using an audio codec, before the mobile device recognizes the speech with an audio processor. Various input characteristics for the audio input affect its quality or recognition capability, such as a sampling rate or frequency range. These input characteristics may be dependent on the quality or features of the microphone or other components in an audio input path between the microphone and the audio processor.

The various embodiments described herein allow a mobile device to determine the input characteristics for the audio input and to recognize the speech based on those characteristics. The mobile device configures or "tunes" the audio processor, for example, to improve accuracy, increase speed, or reduce power consumption for the voice recognition. The mobile device in one example performs a lookup of predetermined input characteristics for an input source, such as a microphone with a fixed sampling rate. In another example, the mobile device dynamically determines the input characteristics, for example, based on information associated with the audio input.

The mobile device receives a trigger for the audio input that indicates which input source will provide the audio input, such as a microphone or headset. The trigger may further indicate an audio input path for the audio input (e.g., a wired path or wireless path). The mobile device determines at least one parameter for the audio processor based on input characteristics for the audio input or audio input path. The parameters may include the input characteristics themselves, such as a sampling rate of a microphone or latency of the audio input path. In another example, the parameter is an indicator for which voice recognition engine the audio processor should use, such as a high quality or low quality voice recognition engine. The mobile device routes the audio input to the audio processor, which then performs voice recognition based on the parameters.

In one embodiment, a mobile device receives a trigger for an audio input. The mobile device determines at least one parameter for an audio processor based on at least one input characteristic for the audio input. The mobile device routes the audio input to the audio processor with the at least one parameter.

In another embodiment, a mobile device receives a trigger for an audio input. The mobile device selects a microphone from a set of microphones based on the trigger. The set of microphones includes a local microphone of the mobile device and a remote microphone. The mobile device determines at least one parameter for an audio processor based on the selected microphone. The mobile device receives the audio input from the selected microphone and provides the audio input to the audio processor with the at least one parameter.

Referring to FIG. 1, there is illustrated a perspective view of an example mobile device 100. The mobile device 100 may be any type of device capable of storing and executing multiple applications. Examples of the mobile device 100 include, but are not limited to, mobile devices, smart phones, smart watches, wireless devices, tablet computing devices, personal digital assistants, personal navigation devices, touch screen input device, touch or pen-based input devices, portable video and/or audio players, and the like. It is to be understood that the mobile device 100 may take the form of a variety of form factors, such as, but not limited to, bar, tablet, flip/clam, slider, rotator, and wearable form factors.

For one embodiment, the mobile device 100 has a housing 101 comprising a front surface 103 which includes a visible display 105 and a user interface. For example, the user interface may be a touch screen including a touch-sensitive surface that overlays the display 105. For another embodiment, the user interface or touch screen of the mobile device 100 may include a touch-sensitive surface supported by the housing 101 that does not overlay any type of display. For yet another embodiment, the user interface of the mobile device 100 may include one or more input keys 107.

Examples of the input key or keys 107 include, but are not limited to, keys of an alpha or numeric keypad or keyboard, a physical keys, touch-sensitive surfaces, mechanical surfaces, multipoint directional keys and side buttons or keys 107. The mobile device 100 may also comprise a speaker 109 and microphone 111 for audio output and input at the surface. It is to be understood that the mobile device 100 may include a variety of different combination of displays and interfaces.

The mobile device 100 includes one or more sensors 113 positioned at or within an exterior boundary of the housing 101. For example, as illustrated by FIG. 1, the sensor or sensors 113 may be positioned at the front surface 103 and/or another surface (such as one or more side surfaces 115) of the exterior boundary of the housing 101. The sensor or sensors 113 may include an exterior sensor supported at the exterior boundary to detect an environmental condition associated with an environment external to the housing. The sensor or sensors 113 may also, or in the alternative, include an interior sensors supported within the exterior boundary (i.e., internal to the housing) to detect a condition of the device itself. Examples of the sensors 113 are described below in reference to FIG. 2.

Figure 2:
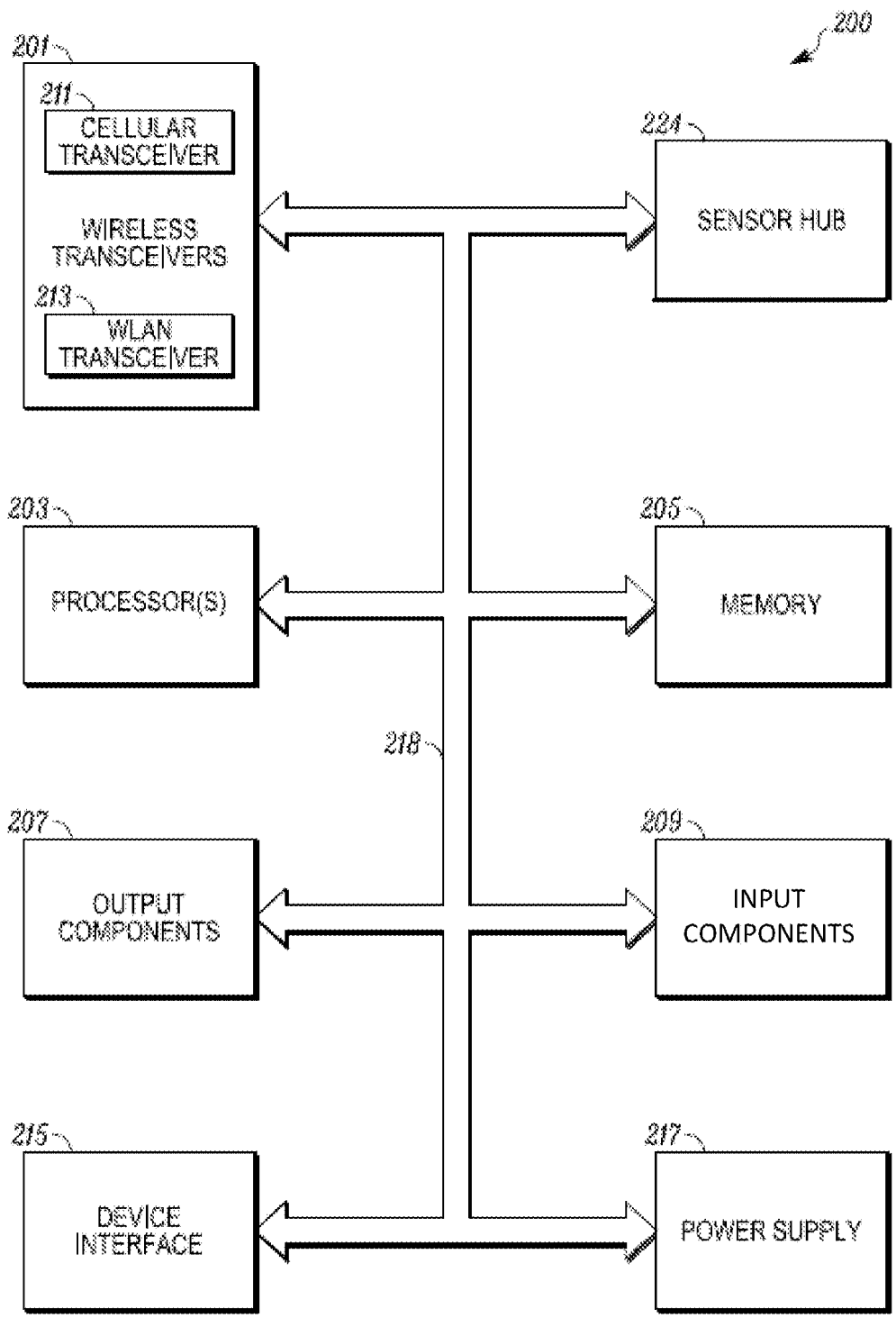
FIG. 2 is a block diagram of example components of a mobile device, according to an embodiment.

Referring to FIG. 2, there is shown a block diagram representing example components (e.g., internal components) 200 of the mobile device 100 of FIG. 1. In the present embodiment, the components 200 include one or more wireless transceivers 201, one or more processors 203, one or more memories 205, one or more output components 207, and one or more input components 209. As already noted above, the mobile device 100 includes a user interface, including the touch screen display 105 that comprises one or more of the output components 207 and one or more of the input components 209. Also as already discussed above, the mobile device 100 includes a plurality of the sensors 113, several of which are described in more detail below. In the present embodiment, the sensors 113 are in communication with (so as to provide sensor signals to or receive control signals from) a sensor hub 224.

Further, the components 200 include a device interface 215 to provide a direct connection to auxiliary components or accessories for additional or enhanced functionality. In addition, the internal components 200 include a power source or supply 217, such as a portable battery, for providing power to the other internal components and allow portability of the mobile device 100. As shown, all of the components 200, and particularly the wireless transceivers 201, processors 203, memories 205, output components 207, input components 209, sensor hub 224, device interface 215, and power supply 217, are coupled directly or indirectly with one another by way of one or more internal communication link(s) 218 (e.g., an internal communications bus).

Further, in the present embodiment of FIG. 2, the wireless transceivers 201 particularly include a cellular transceiver 211 and a Wi-Fi transceiver 213. Although in the present embodiment the wireless transceivers 201 particularly include two of the wireless transceivers 211 and 213, the present disclosure is intended to encompass numerous embodiments in which any arbitrary number of (e.g., more than two) wireless transceivers employing any arbitrary number of (e.g., two or more) communication technologies are present. More particularly, in the present embodiment, the cellular transceiver 211 is configured to conduct cellular communications, such as 3G, 4G, 4G-LTE, vis-à-vis cell towers (not shown), albeit in other embodiments, the cellular transceiver 211 can be configured to utilize any of a variety of other cellular-based communication technologies such as analog communications (using AMPS), digital communications (using CDMA, TDMA, GSM, iDEN, GPRS, EDGE, etc.), or next generation communications (using UMTS, WCDMA, LTE, IEEE 802.16, etc.) or variants thereof.

By contrast, the Wi-Fi transceiver 213 is a wireless local area network (WLAN) transceiver configured to conduct Wi-Fi communications in accordance with the IEEE 802.11 (a, b, g, or n) standard with access points. In other embodiments, the Wi-Fi transceiver 213 can instead (or in addition) conduct other types of communications commonly understood as being encompassed within Wi-Fi communications such as some types of peer-to-peer (e.g., Wi-Fi Peer-to-Peer) communications. Further, in other embodiments, the Wi-Fi transceiver 213 can be replaced or supplemented with one or more other wireless transceivers configured for non-cellular wireless communications including, for example, wireless transceivers employing ad hoc communication technologies such as HomeRF (radio frequency), Home Node B (3G femtocell), Bluetooth, or other wireless communication technologies such as infrared technology. Although in the present embodiment each of the wireless transceivers 201 serves as or includes both a respective transmitter and a respective receiver, it should be appreciated that the wireless transceivers are also intended to encompass one or more receiver(s) that are distinct from any transmitter(s), as well as one or more transmitter(s) that are distinct from any receiver(s). In one example embodiment encompassed herein, the wireless transceiver 201 includes at least one receiver that is a baseband receiver.

Exemplary operation of the wireless transceivers 201 in conjunction with others of the components 200 of the mobile device 100 can take a variety of forms and can include, for example, operation in which, upon reception of wireless signals (as provided, for example, by remote device(s)), the internal components detect communication signals and the transceivers 201 demodulate the communication signals to recover incoming information, such as voice or data, transmitted by the wireless signals. After receiving the incoming information from the transceivers 201, the processors 203 format the incoming information for the one or more output components 207. Likewise, for transmission of wireless signals, the processors 203 format outgoing information, which can but need not be activated by the input components 209, and convey the outgoing information to one or more of the wireless transceivers 201 for modulation so as to provide modulated communication signals to be transmitted. The wireless transceiver(s) 201 convey the modulated communication signals by way of wireless (as well as possibly wired) communication links to other devices (e.g., remote devices). The wireless transceivers 201 in one example allow the mobile device 100 to exchange messages with remote devices, for example, a remote network entity (not shown) of a cellular network or WLAN network. Examples of the remote network entity include an application server, web server, database server, or other network entity accessible through the wireless transceivers 201 either directly or indirectly via one or more intermediate devices or networks (e.g., via a WLAN access point, the Internet, LTE network, or other network).

Depending upon the embodiment, the output and input components 207, 209 of the components 200 can include a variety of visual, audio, or mechanical outputs. For example, the output device(s) 207 can include one or more visual output devices such as a cathode ray tube, liquid crystal display, plasma display, video screen, incandescent light, fluorescent light, front or rear projection display, and light emitting diode indicator, one or more audio output devices such as a speaker, alarm, or buzzer, or one or more mechanical output devices such as a vibrating mechanism or motion-based mechanism. Likewise, by example, the input device(s) 209 can include one or more visual input devices such as an optical sensor (for example, a camera lens and photosensor), one or more audio input devices such as a microphone, and one or more mechanical input devices such as a flip sensor, keyboard, keypad, selection button, navigation cluster, touch pad, capacitive sensor, motion sensor, and switch.

As already noted, the various sensors 113 in the present embodiment can be controlled by the sensor hub 224, which can operate in response to or independent of the processor(s) 203. Examples of the various sensors 113 may include, but are not limited to, power sensors, temperature sensors, pressure sensors, moisture sensors, ambient noise sensors, motion sensors (e.g., accelerometers or Gyro sensors), light sensors, proximity sensors (e.g., a light detecting sensor, an ultrasound transceiver or an infrared transceiver), other touch sensors, altitude sensors, one or more location circuits/components that can include, for example, a Global Positioning System (GPS) receiver, a triangulation receiver, an accelerometer, a tilt sensor, a gyroscope, or any other information collecting device that can identify a current location or user-device interface (carry mode) of the mobile device 100.

With respect to the processor(s) 203, the processor(s) can include any one or more processing or control devices such as, for example, a microprocessor, digital signal processor, microcomputer, application-specific integrated circuit, etc. The processors 203 can generate commands, for example, based on information received from the one or more input components 209. The processor(s) 203 can process the received information alone or in combination with other data, such as information stored in the memories 205. Thus, the memories 205 of the components 200 can be used by the processors 203 to store and retrieve data.

Further, the memories (or memory portions) 205 of the components 200 can encompass one or more memory devices of any of a variety of forms (e.g., read-only memory, random access memory, static random access memory, dynamic random access memory, etc.), and can be used by the processors 203 to store and retrieve data. In some embodiments, one or more of the memories 205 can be integrated with one or more of the processors 203 in a single device (e.g., a processing device including memory or processor-in-memory (PIM)), albeit such a single device will still typically have distinct portions/sections that perform the different processing and memory functions and that can be considered separate devices. The data that is stored by the memories 205 can include, but need not be limited to, operating systems, applications, and informational data.

Each operating system includes executable code that controls basic functions of the mobile device 100, such as interaction among the various components included among the components 200, communication with external devices or networks via the wireless transceivers 201 or the device interface 215, and storage and retrieval of applications and data, to and from the memories 205. Each application includes executable code that utilizes an operating system to provide more specific functionality, such as file system service and handling of protected and unprotected data stored in the memories 205. Such operating system or application information can include software update information (which can be understood to potentially encompass updates to either application(s) or operating system(s) or both). As for informational data, this is non-executable code or information that can be referenced or manipulated by an operating system or application for performing functions of the mobile device 100.

It is to be understood that FIG. 2 is provided for illustrative purposes only and for illustrating components of an mobile device in accordance with various embodiments, and is not intended to be a complete schematic diagram of the various components required for an mobile device. Therefore, an mobile device can include various other components not shown in FIG. 2, or can include a combination of two or more components or a division of a particular component into two or more separate components, and still be within the scope of the disclosed embodiments.

Figure 3:
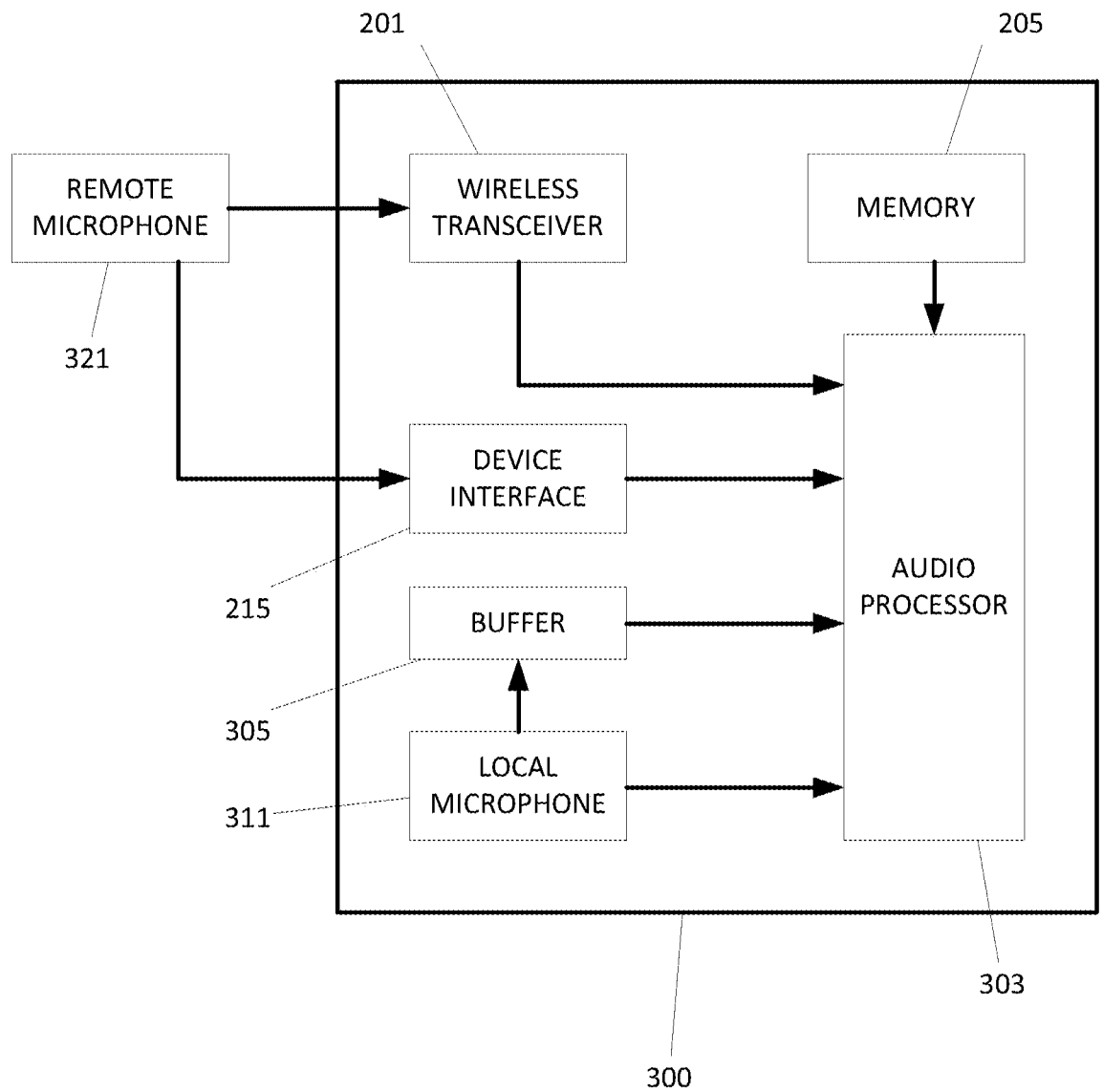
FIG. 3 is a block diagram of a mobile device for receiving audio input from multiple input sources, according to an embodiment.

Turning to FIG. 3, a block diagram 300 illustrates another embodiment of the mobile device 100 along with a remote microphone 319. As shown in FIG. 3, the mobile device 100 comprises the wireless transceiver 201, the memory 205, and the device interface 215. The mobile device further comprises an audio processor 303, a buffer 305, and a local microphone 311. The audio processor 303 in one example is an instance of the processor 203, such as a digital signal processor or an application processor. The buffer 305 in one example is an instance of the memory 205 that is available as an intermediate buffer for audio inputs from the local microphone 311. The local microphone 311 is an instance of the microphone 111. In one example, multiple instances of the local microphone 311 cooperate to provide the audio input.

The remote microphone 321 is remotely located from the mobile device 100 and not integrated with the mobile device 100. For example, the remote microphone 321 comprises a headset accessory for the mobile device 100. In the implementation shown in FIG. 3, the remote microphone 321 is a wireless-enabled headset that provides the audio input to the mobile device 100 via the wireless transceiver 201 (e.g., a Bluetooth transceiver via a synchronous connection-oriented link). In another example, the remote microphone 321 is a wired headset that provides the audio input to the mobile device 100 via the device interface 215. In yet another example, the remote microphone 321 is located in an electronic device, such as a voice-activated household appliance (e.g., a television, thermostat, entertainment console, or lighting system), an automobile, desktop computer, or other devices as will be apparent to those skilled in the art. In this case, the remote microphone 321 provides the audio input to the mobile device 100 via the wireless transceiver 201, such as the cellular transceiver 211, WLAN transceiver 213, or a Bluetooth transceiver. In one example, a plurality of remote microphones 321 cooperates to provide the voice input. For example, multiple microphones 321 may be spread throughout a user's home to provide a voice activation capability.

Referring to FIG. 3, a plurality of audio input paths are available for providing audio input to the mobile device 100. A first path starts with the local microphone 311 and proceeds "directly" to the audio processor 303 (e.g., without substantial processing by other components). In this case, the audio input may be provided to the audio processor 303 substantially in real-time. In one example, the mobile device 100 comprises an Integrated Interchip Sound ("I2S") bus for providing the audio input from the local microphone 311 to the audio processor 303.

A second path starts with the local microphone 311 and proceeds through the buffer 305 to reach the audio processor 303. In this case, the mobile device 100 stores the audio input in the buffer 305 before providing the audio input to the audio processor 303. Storage in an intermediate buffer (e.g., the buffer 305 or the memory 205) allows the mobile device 100 additional time for initializing the audio processor 303 or to reduce the effects of high latency in receiving the audio input. A third path is based on both the first path and the second path. In this case, a first portion of the audio input is provided via the second path and buffered, for example, while the audio processor 303 is initialized. Once initialized, the mobile device 100 uses the first path to provide a second portion of the audio input directly from the local microphone 311. The mobile device 100 in one example uses the third path to provide a "one-shot" voice recognition feature of an always-on voice system. For example, the mobile device 100 may listen for a trigger phrase (e.g., "OK Google Now") and then buffer a command phrase that occurs after the trigger phrase while the audio processor 303 is initialized.

A fourth path for audio input starts with the remote microphone 321 and proceeds through the device interface 215 to the audio processor 303. In this case, the remote microphone 321 or the device interface 215 may include a buffer (not shown) for buffering a portion of the audio input. A fifth path starts with the remote microphone 321 and proceeds through the wireless transceiver 201 to the audio processor 303. A sixth path starts with the memory 205 and proceeds to the audio processor 303. In this case, a software program or application records or stores the audio input in the memory 205. Upon receipt of the trigger (e.g., a software trigger or inter-process communication trigger), the mobile device 100 obtains the pre-recorded audio input from the memory 205. For the paths described herein, the audio input or a portion thereof may be stored in the memory 205 for access by the audio processor 303 while still being considered "direct" processing. The mobile device 100 in one example stores the audio input in the memory 205 to reduce the effects of high latency (e.g., from a remote microphone 321 over a Wi-Fi connection).

Figure 4:
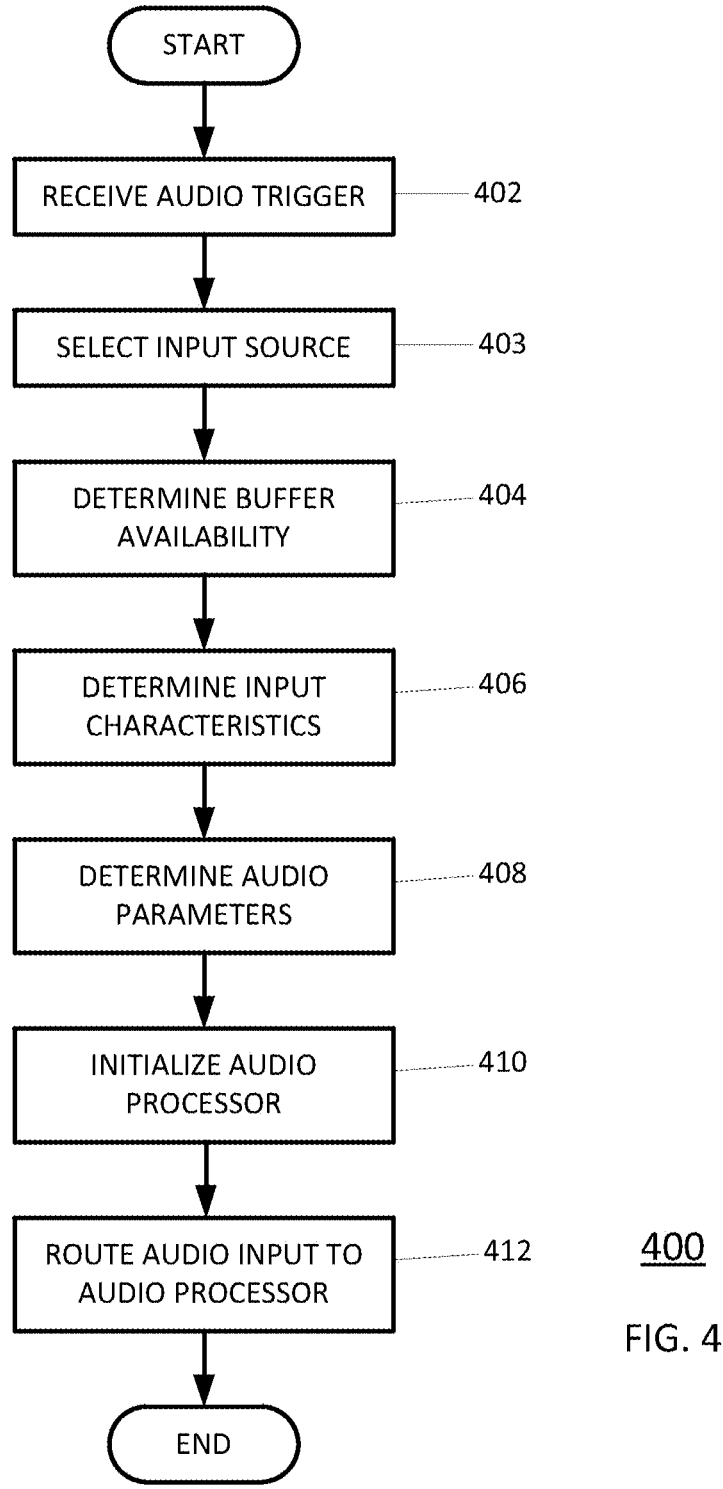
FIG. 4 illustrates a process flow of a method for audio input routing that may be performed by the mobile device of FIG. 3, according to an embodiment.

Turning to FIG. 4, a process flow 400 illustrates a method for audio input routing that may be performed by the mobile device 100. The mobile device 100 receives (402) a trigger for an audio input. The trigger indicates which input source will provide the audio input, such as the local microphone 311, the remote microphone 321, or an application via the memory 205. The trigger may further indicate an audio input path for the audio input (e.g., a wired path or wireless path), as described above, or other input characteristics for the audio input. The audio input path may also include multiple sub-paths for using multiple microphones in cooperation. Based on the audio trigger, the mobile device selects (403) the input source (or multiple sources) for the audio input. The trigger may be a processor interrupt, Bluetooth multifunction button trigger, software trigger, inter-process communication trigger, push notification, button press, audio keyword detection indicator (e.g., "OK Google Now"), or other user input.

The mobile device 100 determines (404) whether the audio input path has an available buffer, such as the buffer 305, a buffer integrated with the remote microphone 321, or a buffer integrated with the wireless transceiver 201. The mobile device 100 determines (406) at least one input characteristic for the audio input. Examples of the input characteristic include a sampling rate (e.g., 8 kHz, 44.1 kHz), quality indicator (e.g., "High Definition)", frequency range (e.g., 300 Hz to 6 kHz), codec type, background noise level, compression feature (e.g., compression type or ratio), noise separation feature, or noise canceling feature for the audio input. The input characteristics may also include a transmission latency for the corresponding audio input path. The mobile device 100 in one example performs a lookup of predetermined input characteristics with an identifier of the input source, such as a microphone name or model number. In another example, the mobile device 100 dynamically determines the input characteristics, for example, based on information associated with the audio input. In this case, the mobile device 100 may determine a sampling rate or codec based on the audio input, such as from a header portion of a file that contains the audio input.

After determination (406) of the input characteristics, the mobile device 100 determines (408) at least one audio parameter for the audio processor 303. The audio parameters are used by the audio processor 303 for performing the voice recognition. The audio parameters may include one or more of the input characteristics, such as the sampling rate, frequency range, or availability of an intermediate buffer (e.g., the buffer 305). In one example, the local microphone 311 and the remote microphone 321 support different sampling rates. In this case, the mobile device 100 selects a sampling rate based on the microphone used for the audio input. For example, a Bluetooth headset may support an 8K sampling rate while the local microphone 311 supports a 16K sampling rate. If the intermediate buffer is available or the remote microphone 321 is selected, the audio parameters may further include an indication of the paths used for the audio input. In another example, the audio parameter is an indicator for which voice recognition engine the audio processor should use, such as a high quality or low quality voice recognition engine. If the audio input path includes a wireless path (e.g., Bluetooth, Wi-Fi, or cellular), the mobile device 100 in one example selects the parameters based on a latency of the wireless path.

The mobile device 100 initializes (410) the audio processor 303 with the audio parameters. Using the audio parameters, the mobile device 100 configures or "tunes" the audio processor 303, for example, to improve accuracy, increase speed, or reduce power consumption for the voice recognition. In one example, the mobile device 100 sends a wakeup signal to the audio processor 303 for the initialization. In another example, the mobile device 100 passes the audio parameters in a function call to a voice recognition application running on the audio processor 303. While initialization (410) is shown after the determination (408) of the audio parameters, in alternative implementations the mobile device 100 begins the initialization after receiving (402) the audio trigger. In this case, the mobile device 100 may perform the initialization in two or more steps, such as waking the audio processor 303 followed by configuration with the audio parameters. The audio processor 303 may also be started or "running" prior to the audio trigger, for example, as a background process or service, or in response to another voice recognition request.

When the audio processor 303 is ready to receive the audio input, the mobile device 100 routes (412) the audio input from the input source to the audio processor 303. In one example, the mobile device 100 streams the audio input to the audio processor 303 substantially in real-time. In another example, the mobile device 100 receives the audio input as an analog audio input from the local microphone 311 or the remote microphone 321 (via the transceiver 201). In yet another example, the mobile device 100 receives the audio input as a digital audio input from the local microphone 311 or the remote microphone 321 (via the transceiver 201). Where the audio input has two or more input sources such as an intermediate buffer and a direct input (e.g., the local microphone 311), the mobile device 100 instructs the audio processor 303 to change from processing the audio input from the intermediate buffer to the direct input.

The mobile device 100 may also provide a prompt or indication to the user when the mobile device 100 is ready to receive the audio input. For example, if an intermediate buffer is not available, the mobile device 100 may provide an audio indication, instruction, or "beep" once the audio processor 303 has been initialized. In another implementation, the mobile device 100 provides instructions to the user upon receipt of the trigger.

It can be seen from the foregoing that a method and system for audio input routing have been described. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

The apparatus described herein may include a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

The disclosed embodiments may be described in terms of functional block components and various processing steps. Such functional blocks may be realized by any number of hardware and/or software components configured to perform the specified functions. For example, the disclosed embodiments may employ various integrated circuit components, e.g., memory elements, processing elements, logic elements, look-up tables, and the like, which may carry out a variety of functions under the control of one or more microprocessors or other control devices. Similarly, where the elements of the disclosed embodiments are implemented using software programming or software elements, the disclosed embodiments may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the disclosed embodiments may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", "device", "controller", and "construction" are used broadly and are not limited to mechanical or physical embodiments, but may include software routines in conjunction with processors, etc.

No item or component is essential to the practice of the disclosed embodiments unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the disclosed embodiments (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g., "such as") provided herein, is intended merely to better illuminate the disclosed embodiments and does not pose a limitation on the scope of the disclosed embodiments unless otherwise claimed. Numerous modifications and adaptations will be readily apparent to those of ordinary skill in this art.

The invention claimed is:

1. A method for performing voice recognition, the method performed by an apparatus and comprising:
   prior to receiving a first audio input:
      configuring an audio processor of the apparatus with at least one first audio parameter that indicates a low-quality voice recognition engine of the apparatus should be utilized to process the first audio input;
   receiving, by the low-quality voice recognition engine of the apparatus via one or more microphones of the apparatus, the first audio input, wherein the low-quality voice recognition engine is local to the apparatus;
   determining, by the low-quality voice recognition engine, that the first audio input corresponds to a trigger phrase, the trigger phrase being a particular phrase;
   initializing, by a processor of the apparatus and responsive to determining that the first audio input corresponds to the trigger phrase, a high-quality voice recognition engine of the apparatus, wherein the high-quality voice recognition engine is also local to the apparatus, wherein initializing the high-quality voice recognition engine of the apparatus and responsive to determining that the first audio input corresponds to the trigger phrase comprises:
      configuring the audio processor of the apparatus with at least one second audio parameter that indicates the high-quality voice recognition engine of the apparatus should be utilized to process any subsequent audio input;

receiving, into a buffer of the apparatus while initializing the high-quality voice recognition engine, a second audio input;

receiving, by the high-quality voice recognition engine after the initialization of the high-quality recognition engine and from the buffer, the second audio input;

performing, by the high-quality voice recognition engine, the voice recognition based on the received second audio input;

determining, by the high-quality voice recognition engine and based on the performed voice recognition on the received second audio input, the second audio input corresponds to a command phrase; and responsive to determining the received second audio input corresponds to the command phrase, performing a function based on the command phrase.

2. The method of claim 1, wherein the first audio input is received via an audio input path that excludes the buffer of the apparatus, and wherein the second audio input is received via an audio input path that include the buffer of the apparatus.

3. The method of claim 2, further comprising:
receiving, by the high-quality voice recognition engine, a third audio input via the audio input path that excludes the buffer and performing, by the high-quality voice recognition engine, voice recognition based on the received third audio input.

4. The method of claim 1, wherein initializing the high-quality voice recognition engine comprises:
determining a latency parameter to be utilized as the at least one second parameter based at least in part on audio data associated with the first audio input; and
configuring the high-quality voice recognition engine using the latency parameter as the at least one second parameter.

5. The method of claim 4, wherein the latency parameter is further based at least in part on the buffer of the apparatus.

6. The method of claim 1, wherein initializing the high-quality voice recognition engine comprises:
determining a frequency range parameter to be utilized as the at least one second parameter based at least in part on audio data associated with the first audio input; and
configuring the high-quality voice recognition engine using the frequency range parameter as the at least one second parameter.

7. The method of claim 1, wherein the high-quality voice recognition engine is configured using both a latency parameter and a frequency range parameter as the at least one second parameter.

8. The method of claim 7, wherein initializing the high-quality voice recognition engine comprises:
determining the latency parameter and the frequency range parameter to be utilized as the at least one second parameter based at least in part on audio data associated with the first audio input; and
configuring the high-quality voice recognition engine using both the latency parameter and the frequency range parameter as the at least one second parameter.

9. The method of claim 7, wherein the high-quality voice recognition engine is further configured using a noise canceling or noise separation feature as the at least one second parameter.

10. An apparatus comprising:
a microphone;
a buffer;
an audio processor that includes a low-quality voice recognition engine and a high-quality voice recognition engine, wherein both the low-quality voice recognition engine and the high-quality voice-recognition engine are local to the apparatus; and
a memory storing instructions that, when executed, cause the audio processor to:
prior to performing a first voice recognition:
configure the audio processor of the apparatus with at least one first audio parameter that indicates the low-quality voice recognition engine of the apparatus should be utilized to perform the first voice recognition;
perform, using the low-quality voice recognition engine, a first voice recognition to determine that a first audio input corresponds to a trigger phrase, wherein the first audio input is received via a first audio input path that excludes the buffer, and wherein the trigger phrase is a particular phrase;
in response to determining that the first audio input corresponds to the trigger phrase, initialize the high-quality voice recognition engine of the apparatus, wherein the instructions to initialize the high-quality engine of the apparatus cause the audio processor to:
configure the audio processor of the apparatus with at least one second audio parameter that indicates the high-quality voice recognition engine of the apparatus should be utilized to perform any subsequent voice recognition; and
subsequent to the initialization of the high-quality recognition engine, perform, by the high-quality voice recognition engine, a second voice recognition to determine that a second audio input corresponds to a command phrase, wherein the second audio input received via a second audio input path that includes the buffer, wherein the second audio input immediately follows the first audio input.

11. The apparatus of claim 10, wherein the instructions to initialize the high-quality voice recognition engine include instructions that cause the audio processor to:
determine a latency parameter to be utilized as the at least one second parameter based at least in part on audio data associated with the first audio input; and
configure the high-quality voice recognition engine using the latency parameter as the at least one second parameter.

12. The apparatus of claim 10, wherein the instructions to initialize the high-quality voice recognition engine include instructions that cause the audio processor to:
determine a frequency range parameter to be utilized as the at least one second parameter based at least in part on audio data associated with the first audio input; and
configure the high-quality voice recognition engine using the frequency range parameter as the at least one second parameter.

13. The apparatus of claim 10, wherein the high-quality voice recognition engine is configured using both a latency parameter and a frequency range parameter as the at least one second parameter.

14. The apparatus of claim 13, wherein the instructions to initialize the high-quality voice recognition engine include instructions that cause the audio processor to:
determine the latency parameter and the frequency range parameter to be utilized as the at least one second parameter based at least in part on audio data associated with the first audio input; and configure the high-quality voice recognition engine using both the latency parameter and the frequency range parameter as the at least one second parameter.

15. The apparatus of claim 13, wherein the high-quality voice recognition engine is further configured using a noise canceling or noise separation feature as the at least one second parameter.

16. The apparatus of claim 10, wherein the apparatus is a smart phone, a smart watch, or a personal digital assistant.

17. The apparatus of claim 10, wherein the buffer is a part of the microphone.

18. The apparatus of claim 10, wherein the first audio input path and the second audio input are digital audio input paths.

19. The apparatus of claim 10, wherein the first audio input path and the second audio input path are analog audio input paths.

* * * * *